United States Patent
Inazawa et al.

(10) Patent No.: US 12,035,037 B2
(45) Date of Patent: Jul. 9, 2024

(54) IMAGE CAPTURING APPARATUS, CONTROL METHOD THEREOF, AND STORAGE MEDIUM

(71) Applicant: CANON KABUSHIKI KAISHA, Tokyo (JP)

(72) Inventors: Keisuke Inazawa, Tokyo (JP); Tomohiro Ota, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 161 days.

(21) Appl. No.: 17/742,614

(22) Filed: May 12, 2022

(65) Prior Publication Data

US 2022/0377249 A1 Nov. 24, 2022

(30) Foreign Application Priority Data

May 18, 2021 (JP) .................. 2021-084086

(51) Int. Cl.
*H04N 23/63* (2023.01)
*H04N 23/62* (2023.01)
*H04N 23/66* (2023.01)

(52) U.S. Cl.
CPC .......... *H04N 23/632* (2023.01); *H04N 23/62* (2023.01); *H04N 23/66* (2023.01)

(58) Field of Classification Search
CPC ...... H04N 23/632; H04N 23/62; H04N 23/66; H04N 23/631; H04N 7/185
See application file for complete search history.

(56) References Cited

U.S. PATENT DOCUMENTS

| | | | |
|---|---|---|---|
| 6,809,759 B1* | 10/2004 | Chiang | H04N 23/63 348/333.13 |
| 2017/0366732 A1 | 12/2017 | Ota | |
| 2020/0099847 A1* | 3/2020 | Fukiage | H04N 23/66 |
| 2023/0362484 A1* | 11/2023 | Ma | H04N 23/632 |

FOREIGN PATENT DOCUMENTS

| | | | | |
|---|---|---|---|---|
| CN | 109167975 A | * | 1/2019 | ........... G06F 3/1454 |
| GB | 2604988 A | | 9/2022 | |
| JP | 2011158659 A | | 8/2011 | |
| JP | 2015128225 A | | 7/2015 | |
| JP | 2019-075633 A | | 5/2019 | |
| JP | 2019129363 A | | 8/2019 | |

OTHER PUBLICATIONS

The above documents were cited in a British Search Report issued on Nov. 3, 2022, a copy of which is enclosed, that issued in the corresponding British Patent Application No. 2206276.4.

* cited by examiner

*Primary Examiner* — Timothy J Henn
(74) *Attorney, Agent, or Firm* — Cowan, Liebowitz & Latman, P.C.

(57) ABSTRACT

An image capturing apparatus capable of being operated by an operation device that is external, the apparatus comprising: an image capturing unit configured to output a first image by capturing an object; and a control unit configured to control, when the first image that is outputted from the image capturing unit is being displayed on a first display unit, in a case where there has been an operation on the operation device to display a second image that is different from the first image on a second display unit of the operation device, whether or not to display the second image on the first display unit.

11 Claims, 13 Drawing Sheets

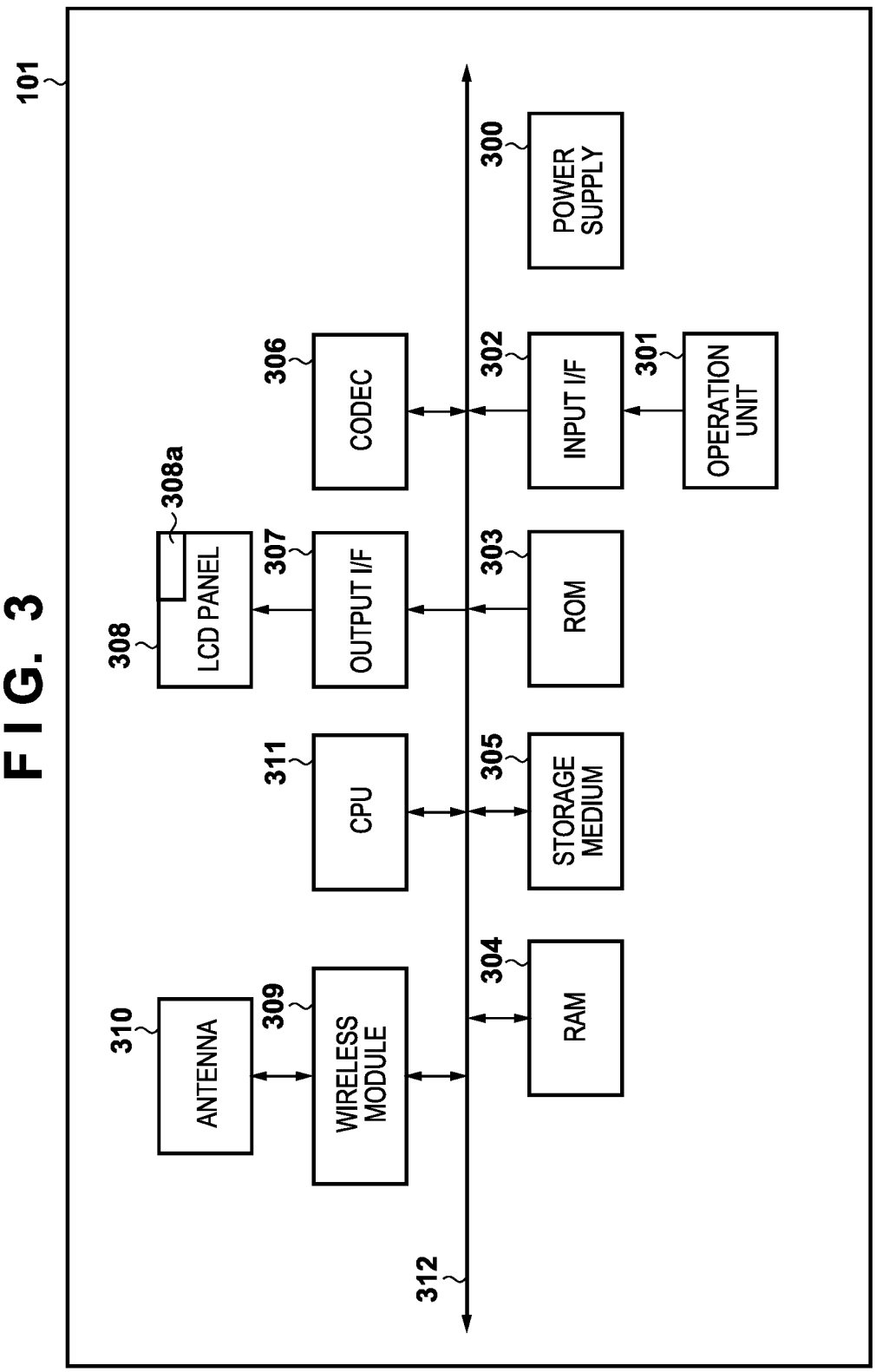

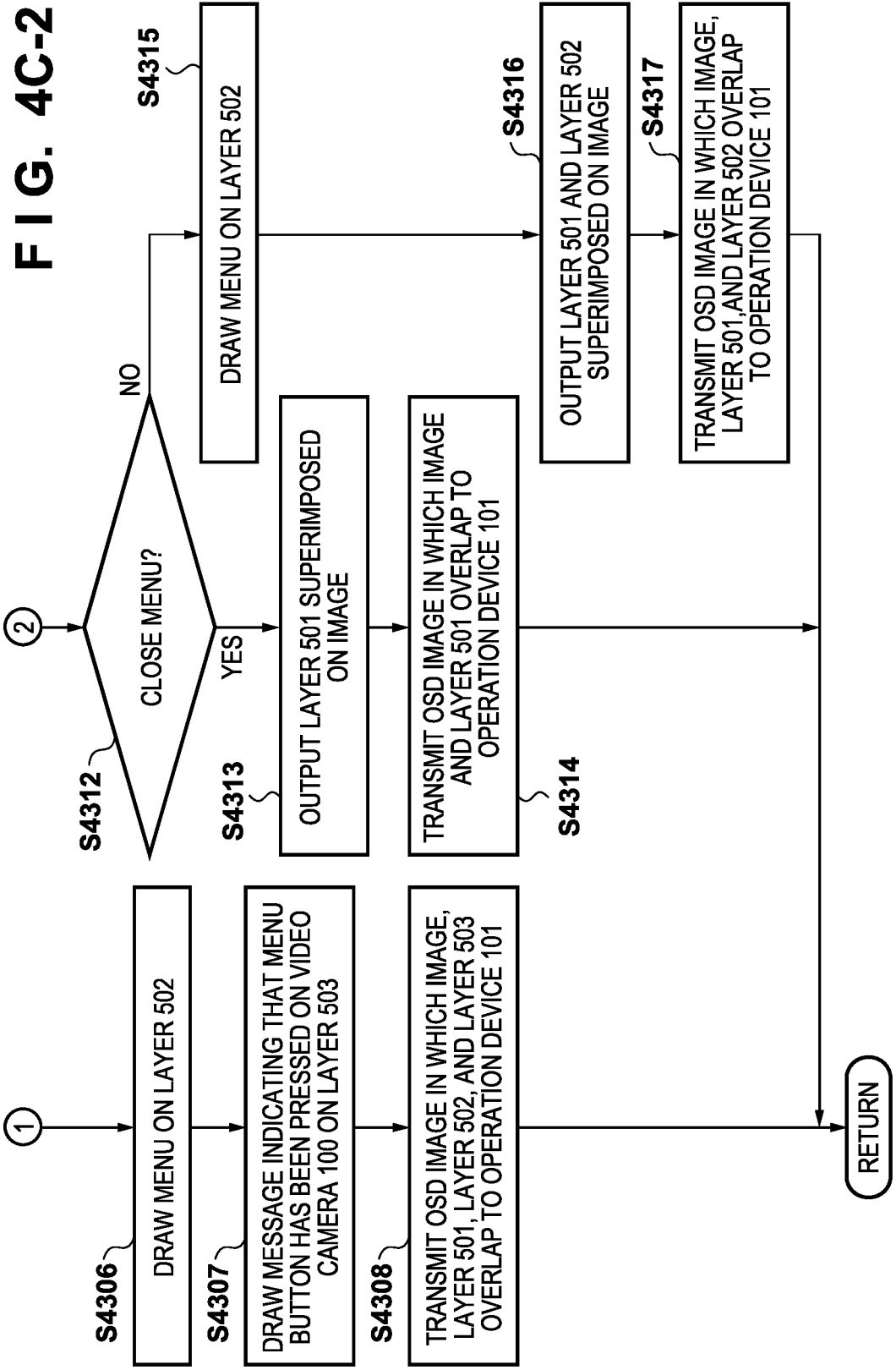

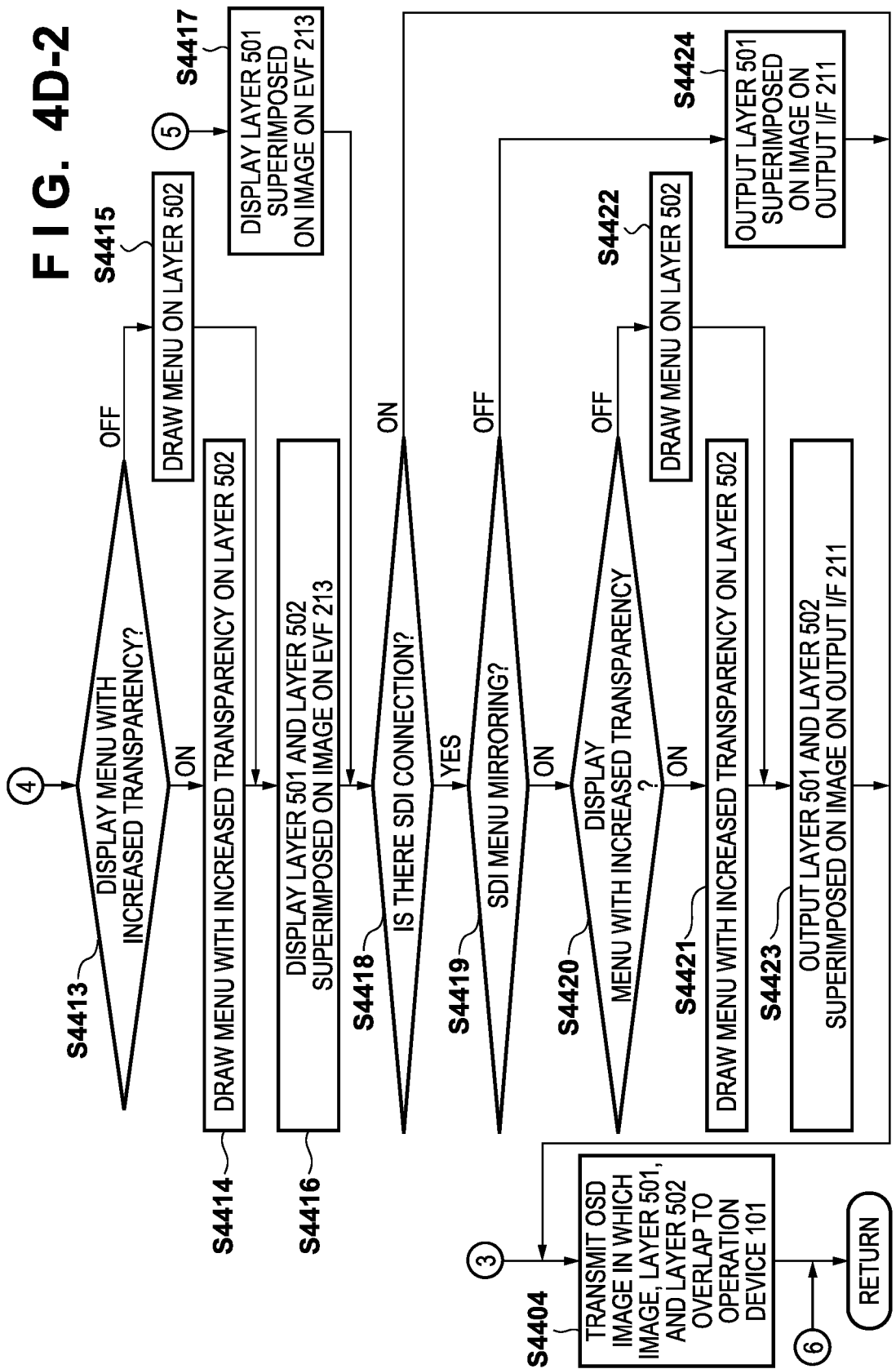

IMAGE CAPTURING APPARATUS, CONTROL METHOD THEREOF, AND STORAGE MEDIUM

BACKGROUND OF THE INVENTION

Field of the Invention

The present invention relates to an image capturing apparatus capable of being operated from an external operation device.

Description of the Related Art

In the field of remotely controllable cameras, cameras that are wired or wirelessly connected to and can be operated by remote terminals, such as smartphones, tablet devices, and PCs, are known.

The control of cameras by remote terminals is useful for role assignment on video production sites where image capturing is performed by a plurality of persons, such as in a case where a cameraman concentrates on focus and framing and an assistant controls other settings.

There are cameras that have, in addition to such a configuration, a function of transmitting an on-screen display (OSD), which includes information on a camera or a menu screen and is displayed superimposed on an image, to a remote terminal with the image. In this configuration, a remote terminal displays an OSD that is superimposed on an image received from a camera and GUI operation members that are equivalent to the keys on the exterior of the camera. A user who operates the camera with the remote terminal operates the camera with the GUI operation members while confirming the image and the OSD. When a GUI operation member is operated on the remote terminal, an operation request is sent to the camera.

In such a configuration, a screen that is the same as the screen in which an OSD is superimposed on an image displayed on the viewfinder of a camera is also displayed on the remote terminal. Therefore, the user can remotely operate the camera by viewing the screen that is the same as that of the camera. In addition, an advantage in the design is that it is possible to reduce design man-hours as it is not necessary to implement a menu screen that is unique to a remote terminal.

Japanese Patent Laid-Open No. 2019-075633 discloses a method of, in an image capturing apparatus, outputting menu generation information for operating the image capturing apparatus to an external monitor via a relay device. Regarding the relay device, a menu image that is based on the menu generation information received from the image capturing apparatus is outputted to an external relay device, and this external relay device outputs the menu image to the external monitor. When a control signal for the image capturing apparatus is received from an external operation device, the relay device transmits the control signal to the image capturing apparatus.

For cameras that can be operated by remote terminals as described above, there are cases where a cameraman confirms the viewfinder of a camera and an assistant sets the camera by displaying a menu screen on a remote terminal. In this case, the menu screen is also displayed on the viewfinder of the camera. Therefore, for the cameraman who is confirming an image with the viewfinder of the camera, a menu is unexpectedly displayed on a screen, resulting in obstruction of image confirmation in some cases.

SUMMARY OF THE INVENTION

The present invention has been made in view of the problems described above and provides an image capturing apparatus in which a menu of a camera can be operated from a remote terminal without obstruction of image confirmation on the camera.

According to a first aspect of the present invention, there is provided an image capturing apparatus capable of being operated by an operation device that is external, the apparatus comprising: an image capturing device configured to capture and output a first image; a first display device; and at least one processor or circuit configured to function as a control unit configured to control, when the first image that is outputted from the image capturing device is being displayed on the first display device, in a case where there has been an operation on the operation device to display a second image that is different from the first image on a second display device of the operation device, whether or not to display the second image on the first display device.

According to a second aspect of the present invention, there is provided a method of controlling an image capturing apparatus capable of being operated by an operation device that is external, the apparatus comprising an image capturing means for capturing and outputting a first image, the method comprising: when the first image that is outputted from the image capturing device is being displayed on a first display device of the image capturing device, in a case where there has been an operation on the operation device to display a second image that is different from the first image on a second display device of the operation device, controlling whether or not to display the second image on the first display device.

Further features of the present invention will become apparent from the following description of exemplary embodiments with reference to the attached drawings.

BRIEF DESCRIPTION OF THE DRAWINGS

FIG. 3 is a block diagram illustrating a configuration of an operation device.

FIGS. 4C-1 and 4C-2 are flowcharts for describing operation of the video camera.

FIGS. 4D-1 and 4D-2 are flowcharts for describing operation of the video camera.

DESCRIPTION OF THE EMBODIMENTS

Figure 1:
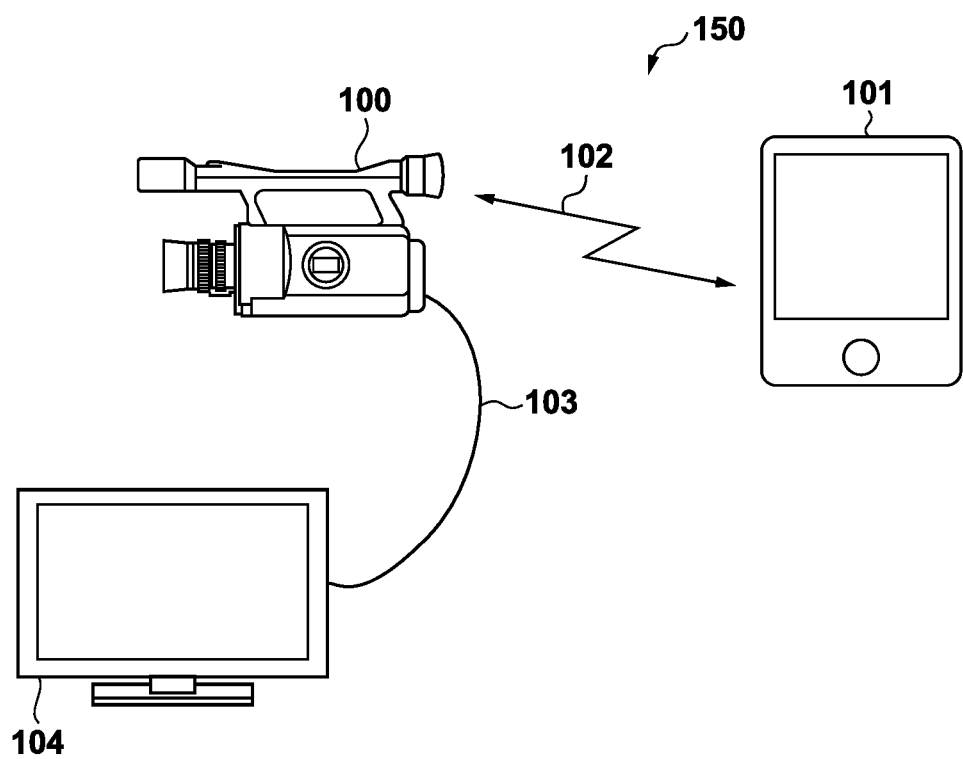
FIG. 1 is a diagram illustrating a configuration of an embodiment of an image capturing system that uses an image capturing apparatus of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 is a diagram illustrating a configuration of an embodiment of an image capturing system that uses an image capturing apparatus of the present invention.

In FIG. 1, an image capturing system 150 includes an operation device 101, a video camera 100 which operates in cooperation with the operation device 101 by wireless communication 102, and a monitor 104 which is connected to the video camera 100 by an SDI cable 103. In the present embodiment, the wireless communication 102 employs, but is not limited to, Wi-Fi®. For example, Bluetooth® or a unique wireless communication system may be used. Alternatively, communication may be wired communication instead of wireless communication. That is, any communication method, such as RS-232C, RS-422A, USB, and Ethernet®, can be adopted in the present embodiment. However, the method needs to enable transmission and reception of images and OSDs (on-screen images).

Figure 2:
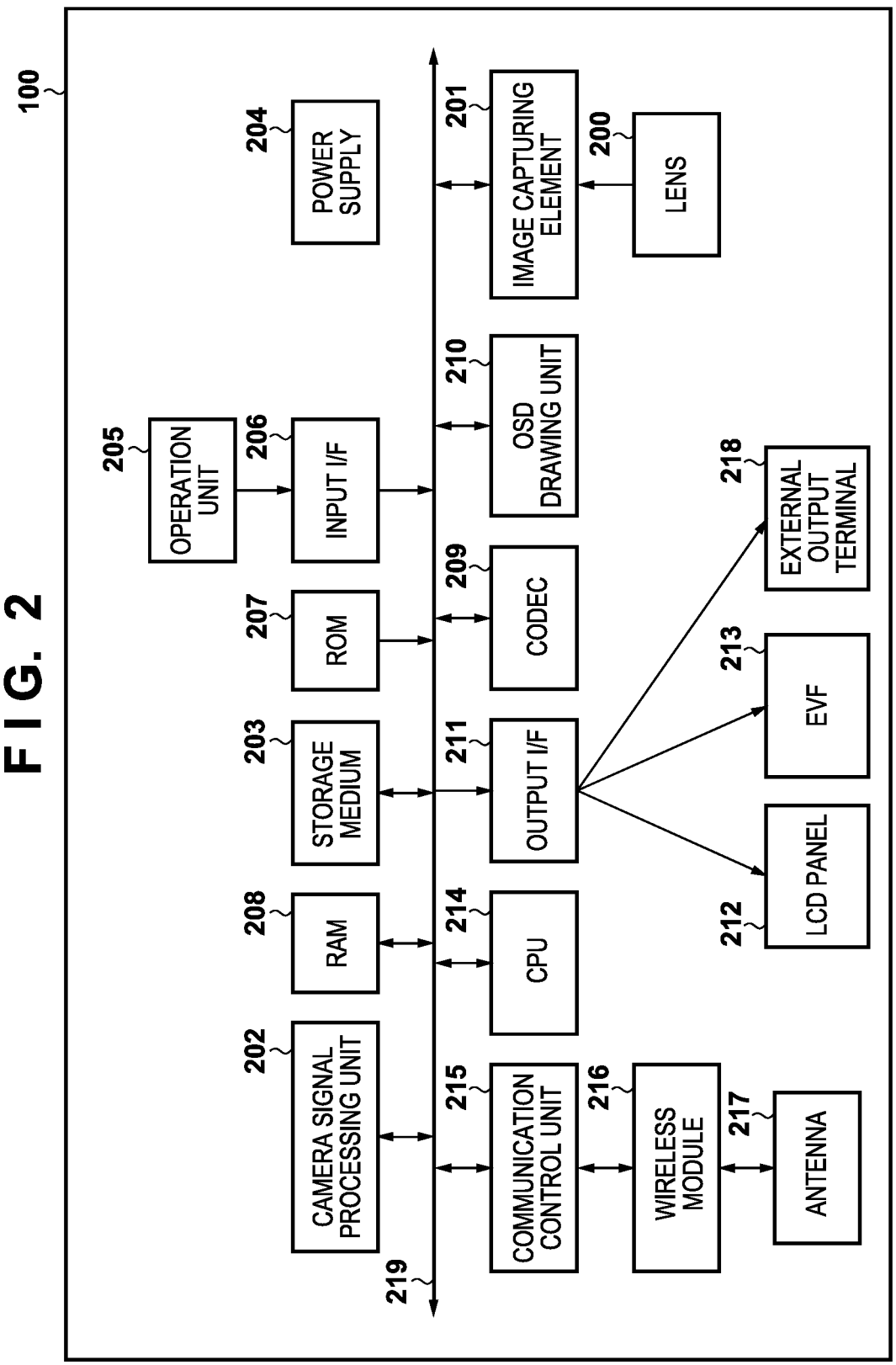
FIG. 2 is a block diagram illustrating a configuration of a video camera.

FIG. 2 is a block diagram illustrating a configuration of the video camera 100 in the present embodiment. The video camera 100 includes a lens 200, a CMOS image capturing element 201, a camera signal processing unit 202, a storage medium 203, a power supply 204, an operation unit 205, an input I/F 206, a ROM 207, a RAM 208, a CODEC 209, and an OSD (on-screen image) drawing unit 210. Further, an output I/F 211, an LCD panel 212, an EVF 213, a CPU 214, a communication control unit 215, a wireless module 216, an antenna 217, and an external output terminal 218 are included. The respective units are controlled by the CPU 214 deploying and executing programs stored in the ROM 207 in the RAM 208, for example, and data is inputted and outputted between one another via a data bus 219.

The lens 200 has a group of image capturing lenses including a focus lens, an aperture mechanism, and the like and forms optical images of objects. The CMOS image capturing element 201 includes an A/D converter and converts optical images formed by the lens 200 to analog electrical signals and then to digital signals. The image capturing element 201 is not limited to a CMOS type, and a CCD and the like may be used. The digital signals outputted from the image capturing element 201 are subjected to resizing processing such as predetermined pixel interpolation and reduction, color conversion processing, various kinds of correction processing, and the like by the camera signal processing unit 202. Further, compression encoding or decoding of compression-encoded data is performed at a predetermined bit rate in a predetermined format by the CODEC 209 to be described later.

The storage medium 203 stores captured images and metadata associated with the images. The power supply 204 is an AC power supply or a battery and supplies power that is necessary for the respective units of the video camera 100. The operation unit 205 includes a switch for controlling ON/OFF of the power supply 204 of the video camera 100, a menu display button, arrow keys, and a pointing device such as a touch panel. Operation information inputted from the operation unit 205 is inputted to the CPU 214 via the input I/F 206 and the data bus 219. The ROM 207 stores programs for controlling the video camera 100, and the CPU 214 controls the respective units based on the programs. In particular, the ROM 207 stores an HTTP server program and a web application that executes a web browser that runs on the operation device 101. The RAM 208 acts as a work area for the CPU 214. Status information of the operation device 101 received in the communication control unit 215 to be described later is also stored.

The CODEC 209 reproduces image data and audio data stored in the RAM 208 or the storage medium 203. The reproduced images are displayed on the LCD panel 212 and the monitor 104 connected to the external output terminal 218.

The OSD drawing unit 210 renders OSDs, such as character strings and icons representing the state or settings of the video camera 100, various frames and markers, and a menu for performing various settings, in a VRAM on the RAM 208. The characters and icons are stored in the ROM 207 and are read out and rendered in VRAM by the OSD drawing unit 210.

The output I/F 211 outputs display signals for performing a display on the LCD panel 212, the EVF 213, and the monitor 104 based on display data such as an OSD generated by the CPU 214 in accordance with a program. The output I/F 211 includes a mixer circuit and outputs image data and an OSD overlapped. Further, it is possible to output signals resized in accordance with the respective outputs. OSDs of the same content can be displayed for the respective outputs, or different content can be displayed by the method to be described below.

The CPU 214 runs a program loaded from the ROM 207 into the RAM 208. The communication control unit 215 receives a request for changing setting information related to image capturing by the video camera 100 from the operation device 101 and transmits a response signal for the request via the wireless module 216. Further, image data, a Web application, and an OSD image are transmitted to the operation device 101. The image data and the OSD image may be transmitted as separate image data, or a composite image in which the image data and the OSD overlap may be transmitted by the output I/F 211.

The antenna 217 transmits and receives radio signals. As for the response signal transmitted to the operation device 101, packet data generated by the CPU 214 and the communication control unit 215 is converted into a modulated signal of the frequency band of a carrier by the wireless module 216 and is transmitted as a radio signal from the antenna 217. The external output terminal 218 satisfies the SDI and HDMI® standards and is a terminal for outputting image signals generated by the image capturing element 201 and the camera signal processing unit 202 to an external device. Although description will be given assuming SDI in the present embodiment, the present invention is not limited to SDI. For example, it may be an analog composite output.

FIG. 3 is a block diagram illustrating a configuration of the operation device 101 in the present embodiment. The operation device 101 includes a power supply 300, an operation unit 301, an input I/F 302, a ROM 303, a RAM 304, a storage medium 305, a CODEC 306, an output I/F 307, an LCD panel 308, a wireless module 309, an antenna 310, and a CPU 311. In addition, data is inputted and outputted via a data bus 312.

The power supply 300 is an AC power supply or a battery and supplies power that is necessary for the respective units of the operation device 101. The operation unit 301 includes a touch panel 308a integrated with the LCD panel 308 as an input device for accepting user operation. The touch panel 308a is an input device that outputs coordinate information corresponding to a position touched on an input unit, which is configured to be flat, and is used for instructing activation and operation of an application that runs on the operation device 101. The touch panel 308a may be a device capable of acquiring contact strength (pressure). Further, the operation unit 301 also includes a switch for controlling the start and stop of the supply of power from the power supply 300 to the operation device 101. The operation from the user inputted on the operation unit 301 is inputted to the CPU 311 via the input I/F 302 and the data bus 312.

The ROM 303 stores a program for starting the operation device 101, and when power is supplied from the power supply 300 by operation of the operation unit 301, the program is read out to the RAM 304 by instruction of the CPU 311. The RAM 304 acts as a work area for the CPU 311. An external storage device such as a hard disk device may be used instead of the ROM 303 or to supplement the area of the RAM 304.

The storage medium 305 stores data received from an external device or program data of some applications to be executed by the CPU 311. A web browser program is stored in at least one of the ROM 303 and the storage medium 305, and a web application received from the wireless module 309 can be executed by the CPU 311. A Web application includes data for reproducing the operation unit of the video camera 100.

The wireless module 309 can receive Web applications, image data, and OSD images. Further, it is possible to transmit information inputted into the operation unit 301 by the user to the video camera 100. The inputted information also includes a menu display request.

The CODEC 306 reproduces data stored on the RAM 304 or the storage medium 305, and the reproduced data is displayed on the LCD panel 308. The output I/F 307 outputs display signals for performing a display on the LCD panel 308 based on display data such as a GUI generated by the CPU 311 in accordance with a program, received image data, and OSD images. Further, the LCD panel 308 displays display signals received via the output I/F 307.

The antenna 310 transmits and receives radio signals. In the present embodiment, it is assumed that wireless communication is performed with the video camera 100, which operates as an HTTP server and is capable of wireless communication. When wirelessly communicating with the video camera 100, the operation device 101 operates as an HTTP client. Signals received by the antenna 310 is demodulated and converted to packet data by the wireless module 309 and are inputted to the CPU 311 via a buffer area of the RAM 304. In addition, the response signal to be transmitted to the video camera 100 upon completion of the reception is converted into packet data by the CPU 311 then into a modulated signal of the frequency band of a carrier by the wireless module 309 and is transmitted from the antenna 310 to the video camera 100.

The CPU 311 executes programs loaded into the RAM 304 from the ROM 303, the storage medium 305, or the wireless module 309. The CPU 311 also has a timer function for adjusting the operation timings of programs.

FIGS. 4A to 4D are flowcharts illustrating operation of the video camera 100 in the present embodiment. These flowcharts are implemented by the CPU 214 controlling the respective units of the video camera 100 by operating based on a program stored in the ROM 207 or the storage medium 203 or a program acquired via the wireless module 216. FIG. 5 is a diagram illustrating a configuration of the layers of an OSD. Layers 501 to 503 are layers of an OSD drawn by the OSD drawing unit 210. The respective layers are created in the area of the RAM 208. The layer 501 indicates a state display layer. The layer 502 indicates a menu display layer. The layer 503 indicates a message display layer. FIGS. 6A to 6F are diagrams illustrating configurations of screens to be displayed on the LCD panel 212, the EVF 213, the monitor 104, and the operation device 101. The respective diagrams of FIGS. 5 and 6A to 6F will be described with reference to flowcharts of FIGS. 4A to 4D.

Figure 4A:
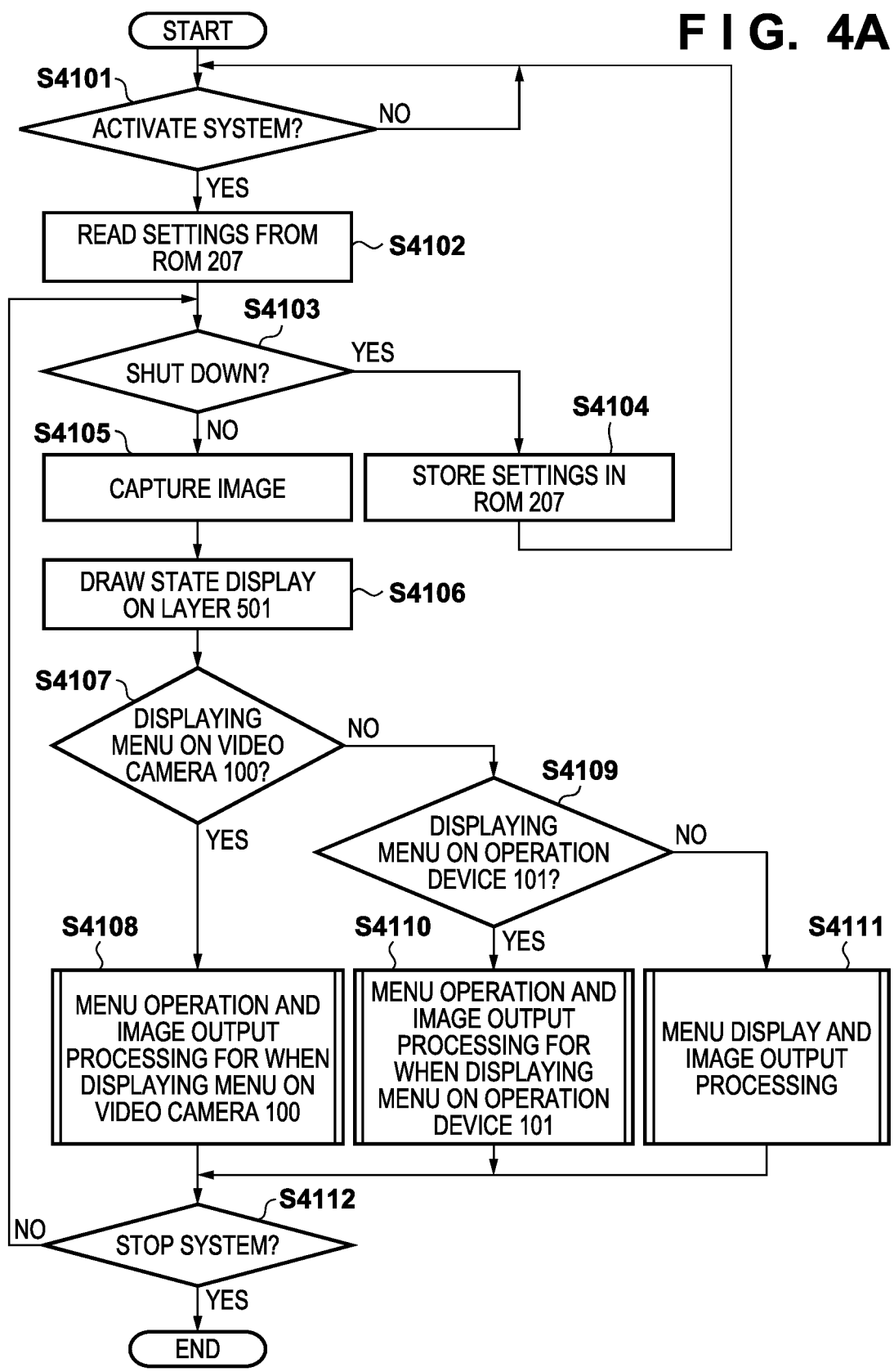
FIG. 4A is a flowchart for describing operation of the video camera.
Figure 5:
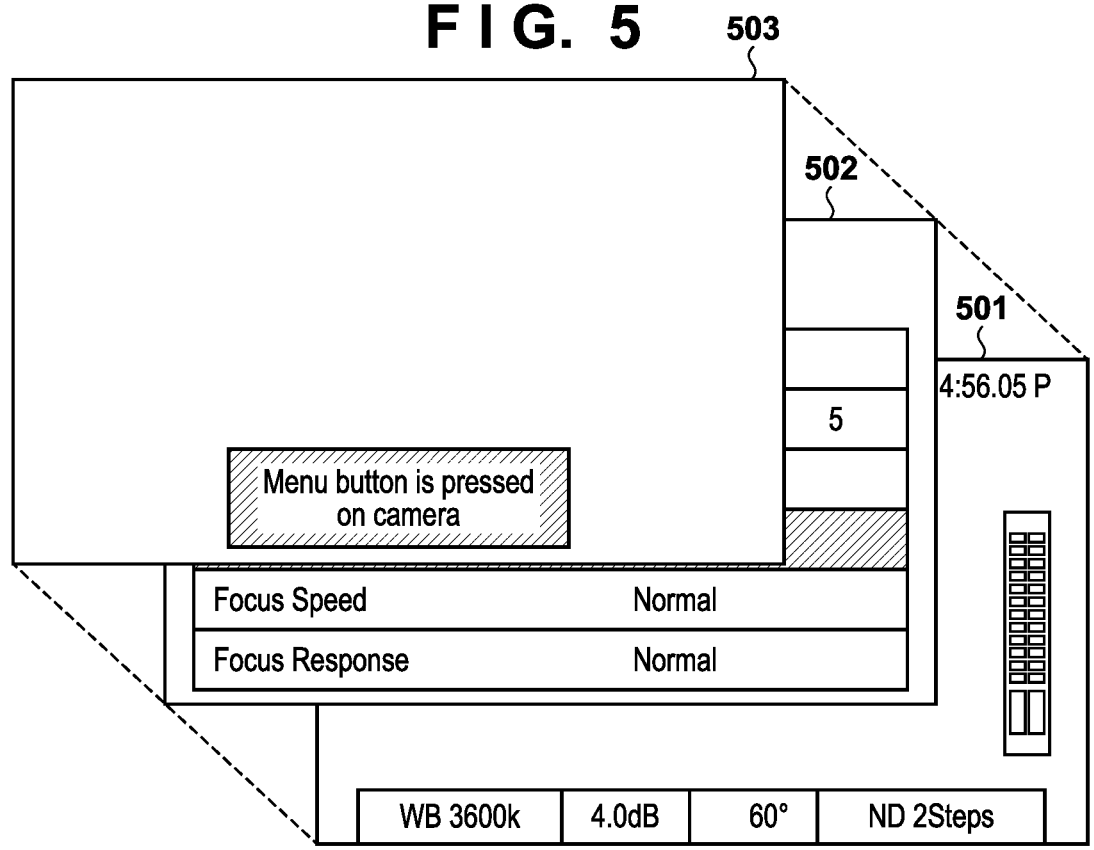
FIG. 5 is a diagram illustrating a configuration of layers of an OSD of the video camera.

FIG. 4A is a flowchart for describing overall operation of the video camera 100.

In step S4101, the CPU 214 determines whether or not the operation unit 205 has instructed the system to activate. If it is determined that an instruction has been given, the CPU 214 advances the process to step S4102; otherwise, the CPU 214 remains waiting.

In step S4102, the CPU 214 reads setting information and flags stored in the ROM 207 to the RAM 208.

In step S4103, the CPU 214 determines whether or not the operation unit 205 has instructed a shutdown. If it is determined that an instruction has been given, the CPU 214 advances the process to step S4104; otherwise, the CPU 214 advances the process to step S4105.

In step S4104, the CPU 214 stores the setting information and flags stored in the RAM 208 in the ROM 207 so that they can be retained even when the power is turned off. The CPU 214 then returns the process to step S4101.

In step S4105, the CPU 214 captures an image by the image capturing element 201 and performs control so as to process the image by the camera signal processing unit 202.

In step S4106, the CPU 214 performs control so that the OSD drawing unit 210 draws a state display, such as character strings and icons representing the state and settings of the video camera 100 and various frames and markers, on the layer 501 of FIG. 5. The camera state and setting values for various frames and markers are read from the RAM 208.

In step S4107, the CPU 214 determines whether or not the state is that in which the video camera 100 is displaying a menu screen. If it is determined that the menu screen is being displayed, the CPU 214 advances the process to step S4108; otherwise, the CPU 214 advances the process to step S4109.

In step S4108, the CPU 214 performs a menu operation and image output processing for when displaying a menu screen on the video camera 100 based on the flowchart of FIG. 4B to be described later.

In step S4109, the CPU 214 determines whether or not the state is that in which the operation device 101 is displaying a menu screen. If it is determined that the menu screen is being displayed, the CPU 214 advances the process to step S4110; otherwise, the CPU 214 advances the process to step S4111.

In step S4110, the CPU 214 performs a menu operation and image output processing for when displaying a menu screen on the operation device 101 based on the flowcharts of FIGS. 4C-1 and 4C-2 to be described later.

In step S4111, the CPU 214 performs a menu screen display operation and image output processing based on the flowcharts of FIGS. 4D-1 and 4D-2 to be described later.

In step S4112, the CPU 214 determines whether or not the operation unit 205 has instructed the system to stop. If it is determined that an instruction has been given, the CPU 214 ends this flow; otherwise, the CPU 214 returns the process to step S4103.

Figure 4B:
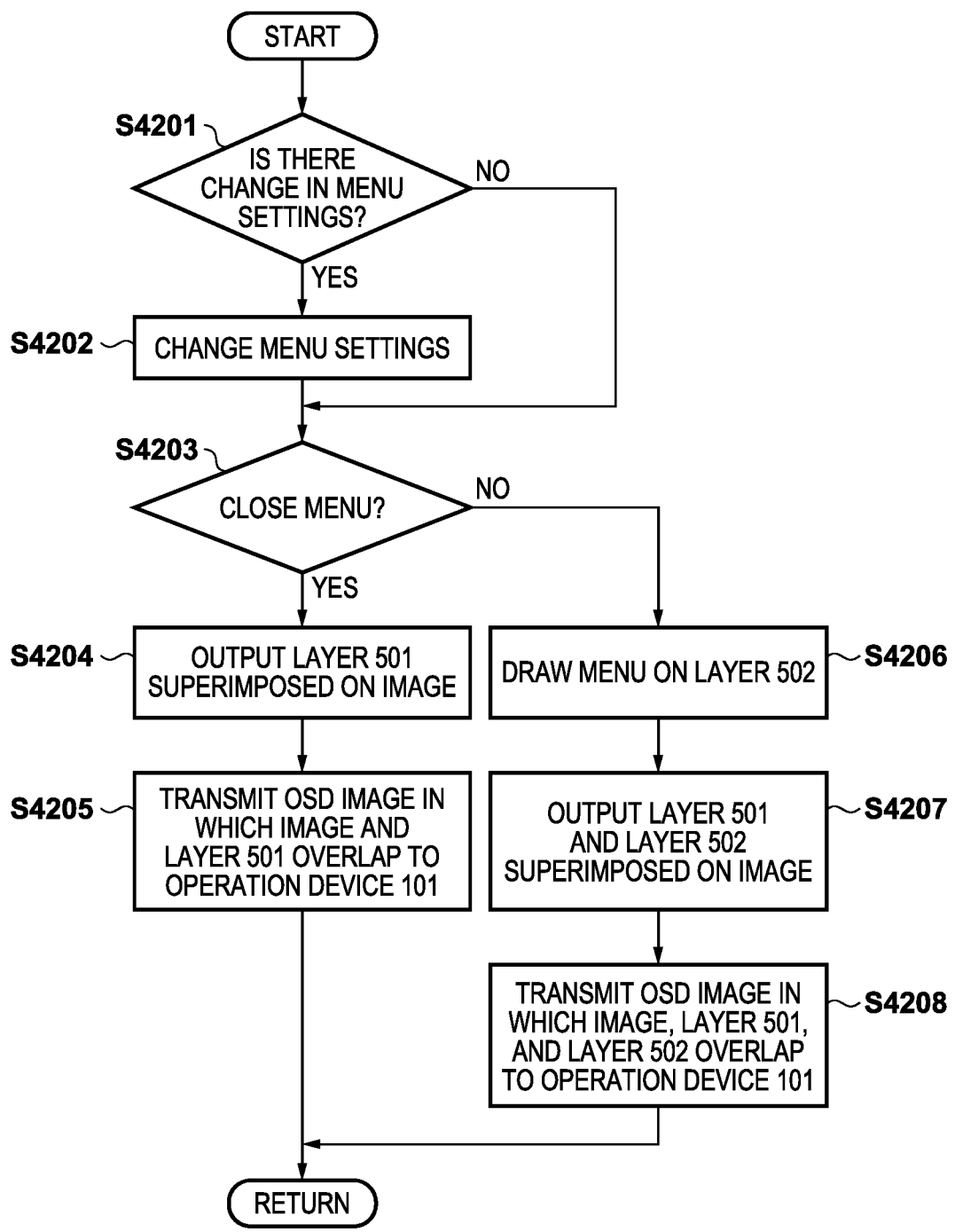
FIG. 4B is a flowchart for describing operation of the video camera.

FIG. 4B is a flowchart of a menu operation and image output processing for when a menu screen is displayed on the video camera 100 to be executed in step S4108.

In step S4201, the CPU 214 determines whether or not menu settings have been changed by a menu operation by the operation unit 205. The menu settings include a setting for "making menu display between the camera and the remote terminal mutually exclusive", a setting for "display the menu by mirroring the menu display on the remote terminal", and a setting for "displaying the menu to be mirrored with increased transparency". If it is determined that the menu settings have been changed, the CPU 214 advances the process to step S4202; otherwise, the CPU 214 advances the process to step S4203.

In step S4202, the CPU 214 stores the set values in the RAM 208.

In step S4203, the CPU 214 determines whether or not to close the menu screen. If it is determined to close the menu, the CPU 214 advances the process to step S4204; otherwise, the CPU 214 advances the process to step S4206.

Figure 6A:
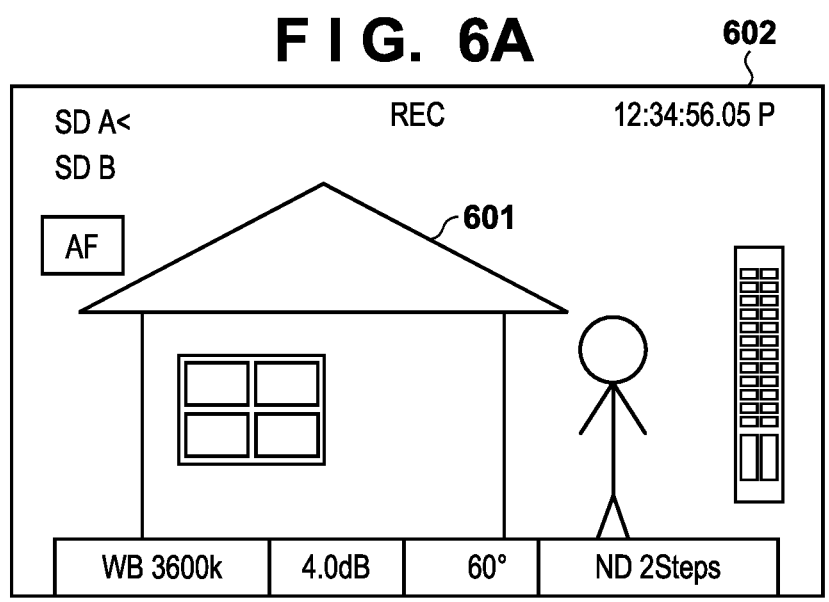
FIG. 6A is a diagram illustrating a configuration of a screen of the video camera and the operation device.

In step S4204, the CPU 214 outputs a screen in which the layer 501 has been superimposed on an image to each of the display unit and the output unit. FIG. 6A illustrates a configuration of the screen at this time. On the screen, an image 601 is displayed, and a state display 602 indicates that the video camera 100 is in a recording state.

Figure 6B:
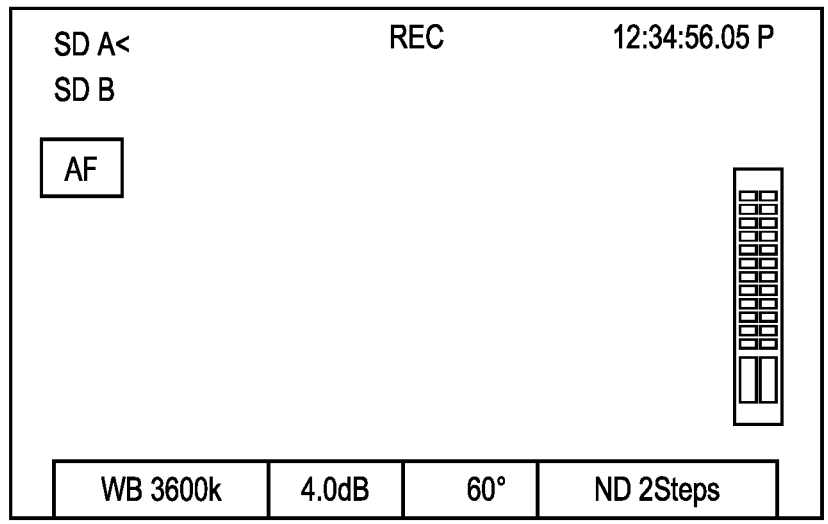
FIG. 6B is a diagram illustrating a configuration of a screen of the video camera and the operation device.

In step S4205, the CPU 214 generates an OSD image of the layer 501 and transmits image data and the OSD image via the wireless module 216 to the operation device 101. FIG. 6B illustrates the OSD image at this time. As for the image data and OSD image to be transmitted, it is assumed that the OSD image is displayed superimposed on the image data on the LCD panel 308 of the operation device 101 as in FIG. 6A. Then, this flow is ended.

In step S4206, the CPU 214 performs control so that the OSD drawing unit 210 draws a menu on the layer 502. The menu information is read from the RAM 208 by the OSD drawing unit 210.

Figure 6C:
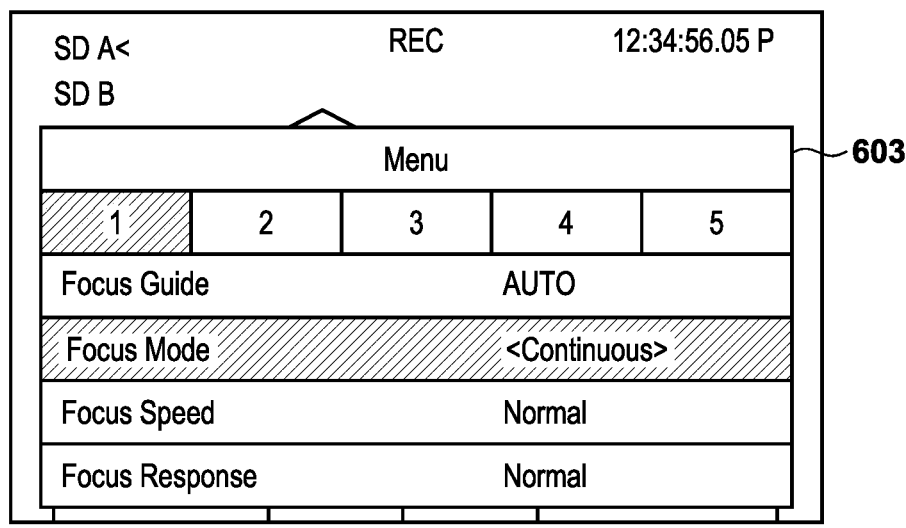
FIG. 6C is a diagram illustrating a configuration of a screen of the video camera and the operation device.

In step S4207, the CPU 214 outputs a screen in which the layer 501 and the layer 502 have been superimposed on an image to each of the display unit and the output unit. FIG. 6C illustrates a configuration of the screen at this time. A menu 603 is displayed on the screen.

In step S4208, the CPU 214 generates an OSD image in which the layer 501 and the layer 502 overlap and transmits image data and the OSD image via the wireless module 216 to the operation device 101. Then, this flow is ended.

Figures 1, 4C:
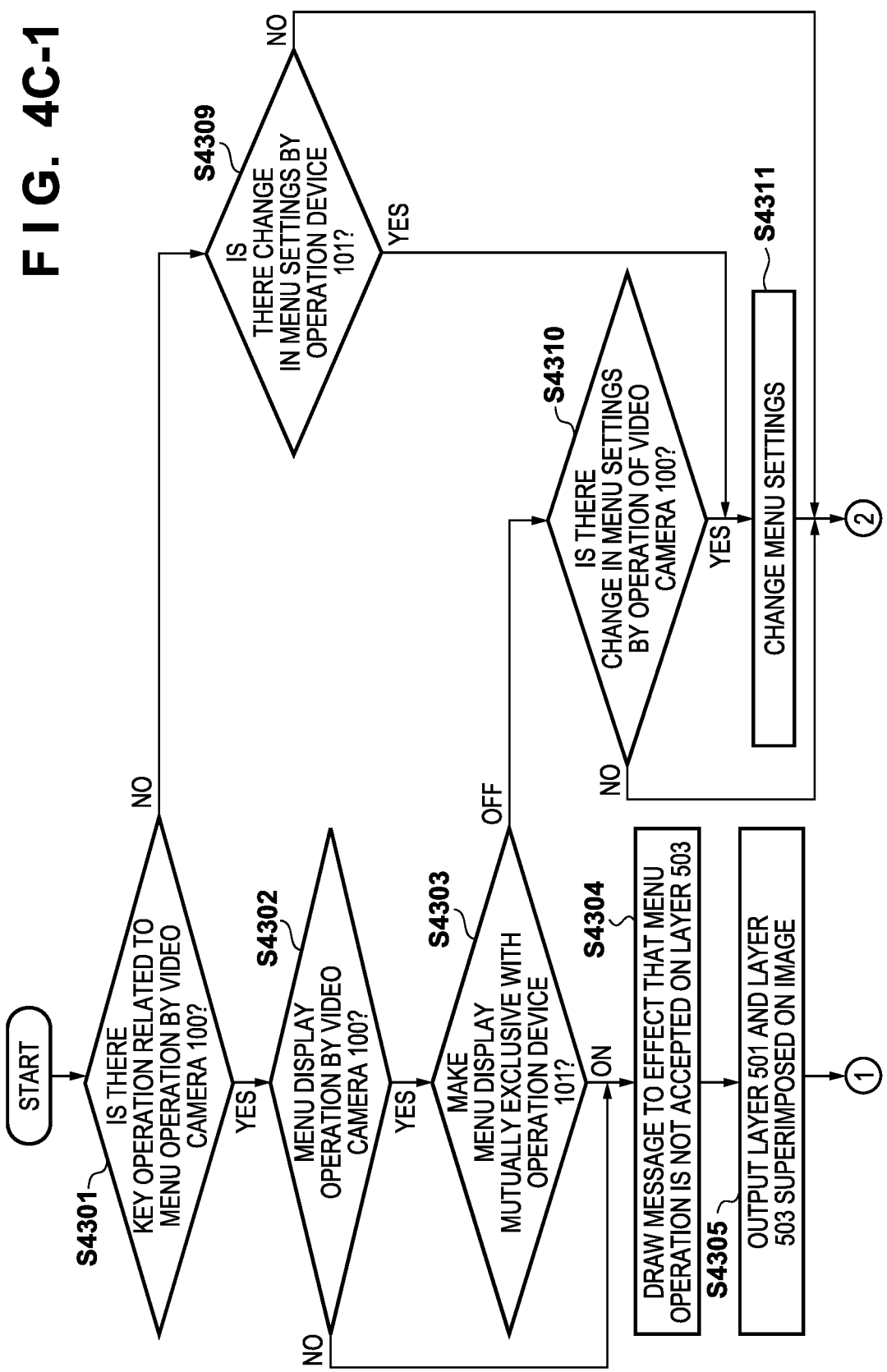

FIGS. 4C-1 and 4C-2 are flowcharts for describing the processing to be executed in step S4110 and illustrates a flow of a menu operation and image output processing for when a menu screen is displayed on the operation device 101.

In step S4301, the CPU 214 determines whether or not there has been a key operation related to a menu operation by the operation unit 205. If it is determined that there has been an operation, the CPU 214 advances the process to step S4302; otherwise, the CPU 214 advances the process to step S4309.

In step S4302, the CPU 214 determines whether or not the operation by the operation unit 205 is a menu display request by a press of a menu button. If it is determined to be a menu display request, the CPU 214 advances the process to step S4303; otherwise, the CPU 214 advances the process to step S4304.

In step S4303, the CPU 214 determines whether the setting for "making menu display between the camera and the remote terminal mutually exclusive" of the video camera 100 is ON or OFF. When this setting is on, menu display and operation on the video camera 100 becomes impossible when a menu is displayed in the operation device 101. This setting value is set and stored in the RAM 208 in step S4202 or step S4311 and, at this point, is read from the RAM 208. The same applies to the settings used for subsequent determinations. If it is determined that the above setting is ON, the CPU 214 advances the process to step S4304; otherwise, the CPU 214 advances the process to step S4310.

In step S4304, the CPU 214 controls the OSD drawing unit 210 to draw a message to the effect that a menu operation is not accepted on the layer 503. The message content is read from the RAM 208 by the OSD drawing unit 210.

Figure 6D:
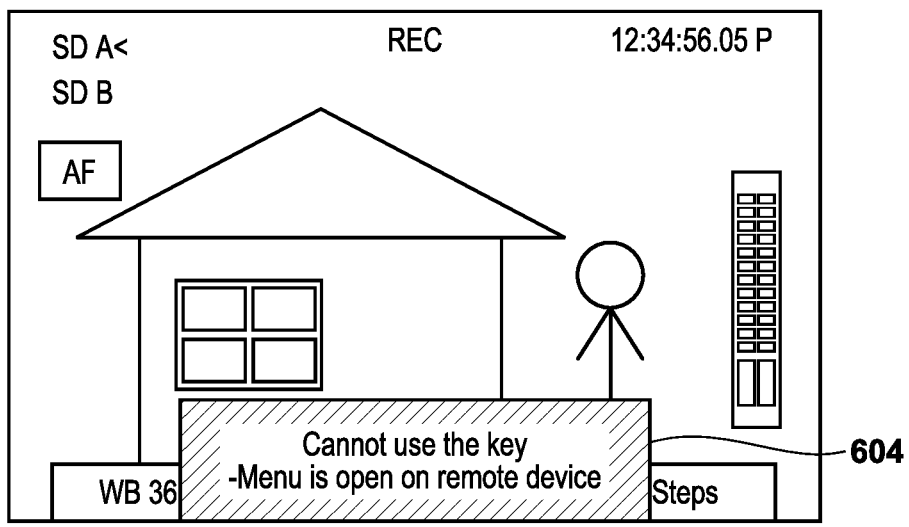
FIG. 6D is a diagram illustrating a configuration of a screen of the video camera and the operation device.

In step S4305, the CPU 214 outputs a screen in which the layer 501 and the layer 503 have been superimposed on an image to each of the display unit and the output unit. FIG. 6D illustrates a configuration of the screen at this time. A message 604 to the effect that a menu operation is not accepted is displayed on the screen. In the present embodiment, the message content is displayed by text, but the present invention is not limited to text. For example, the message content may be implied by a diagram, a mark, or the like. Then, this flow is ended.

In step S4306, the CPU 214 performs control so that the OSD drawing unit 210 draws a menu on the layer 502.

In step S4307, the CPU 214 controls the OSD drawing unit 210 to draw a message to the effect that a menu button has been pressed on the video camera 100 on the layer 503.

Figure 6E:
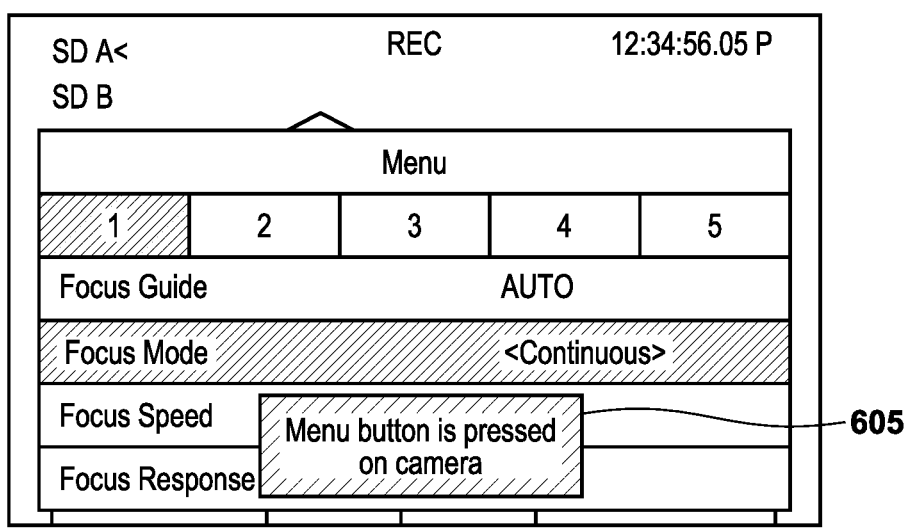
FIG. 6E is a diagram illustrating a configuration of a screen of the video camera and the operation device.

In step S4308, the CPU 214 generates an OSD image in which the layer 501, the layer 502, and the layer 503 overlap and transmits image data and the OSD image via the wireless module 216 to the operation device 101. FIG. 6E illustrates an OSD image at this time. On the screen, a message 605 to the effect that the menu button has been pressed on the video camera 100 is displayed. Similarly to step S4305, the display of the message content is not limited to text.

In step S4309, the CPU 214 determines whether or not the menu settings have been changed by a menu operation request from the operation device 101 received by the wireless module 216. If it is determined that the menu settings have been changed, the CPU 214 advances the process to step S4311; otherwise, the CPU 214 advances the process to step S4312.

In step S4310, the CPU 214 determines whether or not menu settings have been changed by a menu operation by the operation unit 205. If it is determined that there has been a change, the CPU 214 advances the process to step S4311; otherwise, the CPU 214 advances the process to step S4312.

In step S4311, the CPU 214 stores the set values in the RAM 208.

In step S4312, the CPU 214 determines whether or not to close the menu screen. If it is determined to close the menu screen, the CPU 214 advances the process to step S4313; otherwise, the CPU 214 advances the process to step S4315.

In step S4313, the CPU 214 outputs a screen in which the layer 501 has been superimposed on an image to each of the display unit and the output unit.

In step S4314, the CPU 214 generates an OSD image of the layer 501 and transmits image data and the OSD image via the wireless module 216 to the operation device 101. Then, this flow is ended.

In step S4315, the CPU 214 performs control so that the OSD drawing unit 210 draws a menu on the layer 502.

In step S4316, the CPU 214 outputs a screen in which the layer 501 and the layer 502 have been superimposed on an image to each of the display unit and the output unit.

In step S4317, the CPU 214 generates an OSD image in which the layer 501 and the layer 502 overlap and transmits image data and the OSD image via the wireless module 216 to the operation device 101. Then, this flow is ended.

Figures 1, 4D:
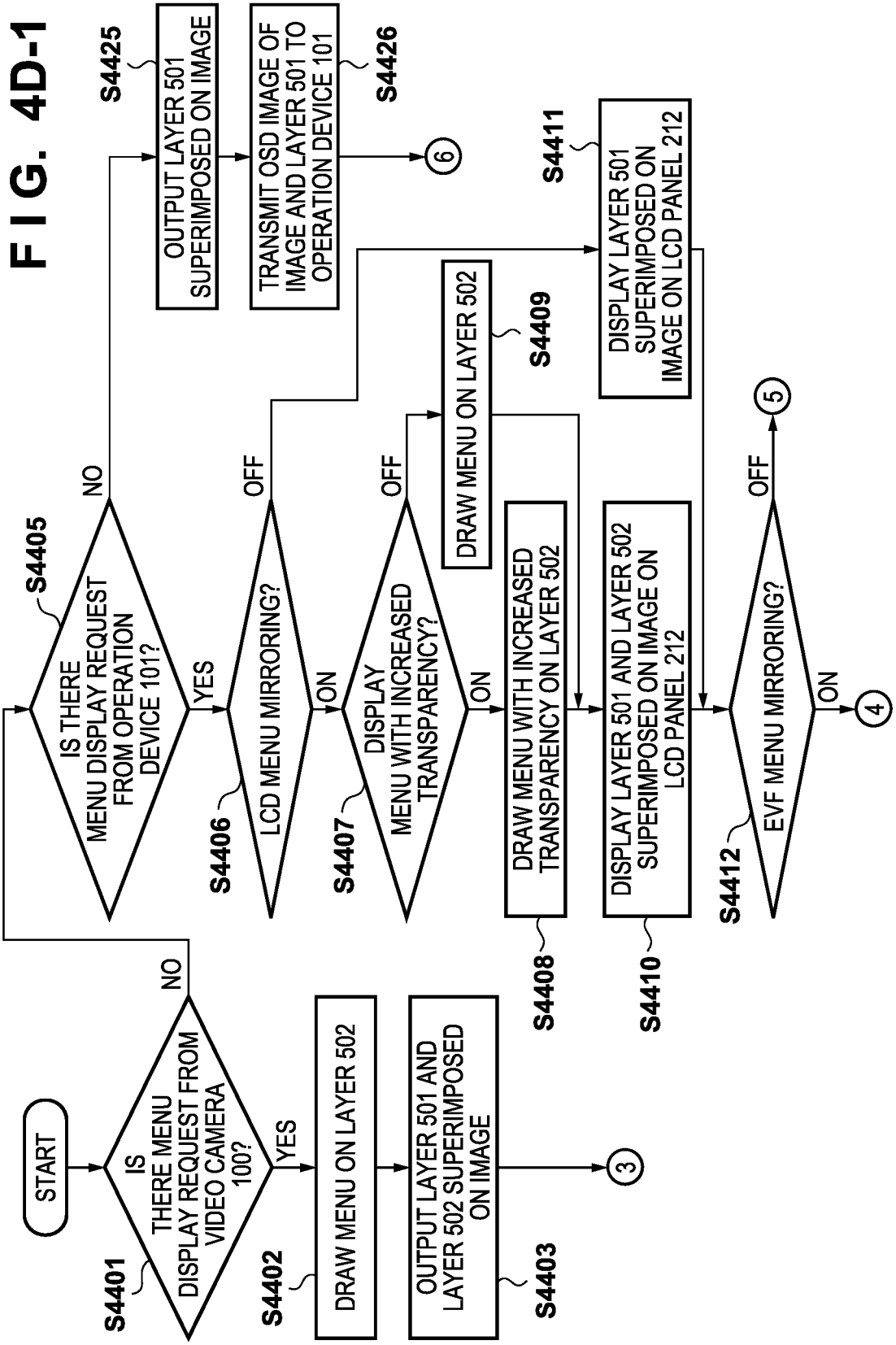

FIGS. 4D-1 and 4D-2 are flowcharts for describing processing performed in step S4111 and illustrates processing and image output processing for when there is a request for displaying a menu from the video camera 100 or the operation device 101.

In step S4401, the CPU 214 determines whether or not there has been a menu display request by a press of a menu button on the operation unit 205. If it is determined that there has been a menu display request, the CPU 214 advances the process to step S4402; otherwise, the CPU 214 advances the process to step S4405.

In step S4402, the CPU 214 performs control so that the OSD drawing unit 210 draws a menu on the layer 502.

In step S4403, the CPU 214 outputs a screen in which the layer 501 and the layer 502 have been superimposed on an image to each of the display unit and the output unit.

In step S4404, the CPU 214 generates an OSD image in which the layer 501 and the layer 502 overlap and transmits image data and the OSD image via the wireless module 216 to the operation device 101. Then, this flow is ended.

In step S4405, the CPU 214 determines whether or not there has been a menu display request by a press of a menu button on the operation unit 301. If it is determined that there has been a menu display request, the CPU 214 advances the process to step S4406; otherwise, the CPU 214 advances the process to step S4425.

In step S4406, the CPU 214 determines whether the setting for "display the menu by mirroring the menu display on the remote terminal" of the LCD panel 212 is ON or OFF. When this setting is on, a menu is mirrored on the LCD panel 212 when the menu is displayed on the operation device 101. If it is determined to be ON, the CPU 214 advances the process to step S4407; otherwise, the CPU 214 advances the process to step S4411.

In step S4407, the CPU 214 determines whether the setting for "displaying the menu to be mirrored with increased transparency" of the LCD panel 212 is ON or OFF. When this setting is on, a menu is displayed with increased transparency when the menu is displayed on the LCD panel 212 in conjunction with a menu display operation on the operation device 101. If it is determined to be ON, the CPU 214 advances the process to step S4408; otherwise, the CPU 214 advances the process to step S4409.

In step S4408, the CPU 214 performs control so that the menu is drawn on the layer 502 by the OSD drawing unit 210 with the transparency increased to a fixed value.

In step S4409, the CPU 214 performs control so that the menu is drawn by the OSD drawing unit 210 on the layer 502.

Figure 6F:
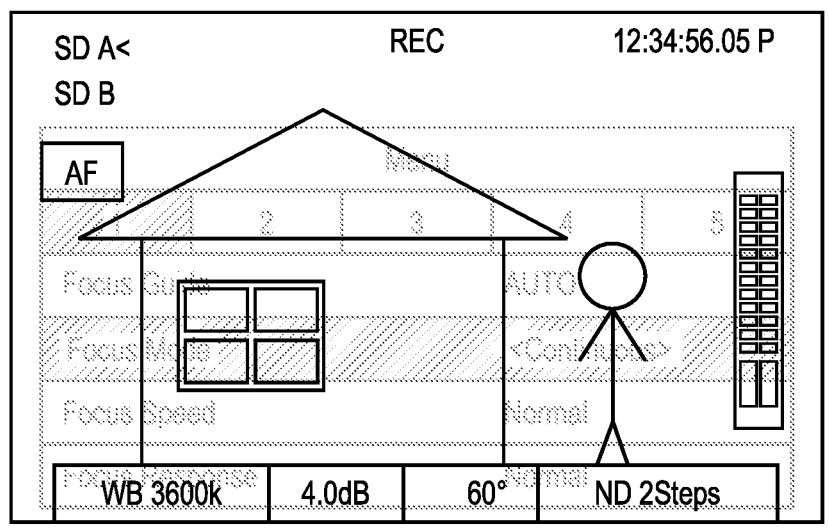
FIG. 6F is a diagram illustrating a configuration of a screen of the video camera and the operation device.

In step S4410, the CPU 214 outputs a screen in which the layer 501 and the layer 502 have been superimposed on an image to the LCD panel 212. FIG. 6F illustrates a screen for when the menu is drawn with increased transparency by the processing in step S4408.

In step S4411, the CPU 214 outputs a screen in which the layer 501 has been superimposed on an image to the LCD panel 212.

In step S4412, the CPU 214 performs the same determination as in step S4406 based on the setting for "display the menu by mirroring the menu display on the remote terminal" of the EVF 213. If it is determined to be ON, the CPU 214 advances the process to step S4413; otherwise, the CPU 214 advances the process to step S4417.

In step S4413, the CPU 214 performs the same processing as in step S4407 based on the setting for "displaying the menu to be mirrored with increased transparency" of the EVF 213. If it is determined to be ON, the CPU 214 advances the process to step S4414; otherwise, the CPU 214 advances the process to step S4415.

In step S4414, the CPU 214 performs the same processing as in step S4408. In step S4415, the CPU 214 performs the same processing as in step S4409. In step S4416, the CPU 214 performs the same processing as in step S4410 on the EVF 213. In step S4417, the CPU 214 performs the same processing as in step S4411 on the EVF 213.

In step S4418, the CPU 214 determines whether or not an SDI terminal is connected to the input I/F 206. If it is determined that it is connected, the CPU 214 advances the process to step S4419; otherwise, the CPU 214 advances the process to step S4404.

In step S4419, the CPU 214 performs the same determination as in step S4406 for the setting for "display the menu by mirroring the menu display on the remote terminal" of the SDI terminal of the input I/F 206. If it is determined to be ON, the CPU 214 advances the process to step S4420; otherwise, the CPU 214 advances the process to step S4424.

In step S4420, the CPU 214 performs the same determination as in step S4407 based on the setting for "displaying the menu to be mirrored with increased transparency" of the SDI terminal of the input I/F 206. If it is determined to be ON, the CPU 214 advances the process to step S4421; otherwise, the CPU 214 advances the process to step S4422.

In step S4421, the CPU 214 performs the same processing as in step S4408. In step S4422, the CPU 214 performs the same processing as in step S4409.

In step S4423, the CPU 214 performs the same processing as in step S4410 on the SDI terminal of the input I/F 206.

In step S4424, the CPU 214 performs the same processing as in step S4411 on the SDI terminal of the input I/F 206.

In step S4425, the CPU 214 outputs a screen in which the layer 501 has been superimposed on an image to each of the display unit and the output unit.

In step S4426, the CPU 214 generates an OSD image of the layer 501 and transmits image data and the OSD image via the wireless module 216 to the operation device 101. Then, this flow is ended.

According to the video camera 100 of the present embodiment, when the video camera 100 is requested to display a menu screen by the operation device 101, it is possible make it so that the operation device 101 displays a menu screen, but the video camera 100 does not display a menu screen. Therefore, a cameraman operating the video camera 100 can concentrate on confirming an image and an assistant operating the operation device 101 can change the settings of the video camera 100 without obstructing the cameraman.

Further, the screen to be confirmed by the cameraman at this time displays information indicating the state of the video camera 100 together with an image. Therefore, it is possible for the cameraman to confirm the image while at least confirming whether or not recording is being performed, which is the most important matter in camera operation, or confirming the time code (time information). Such display control can be performed in conjunction with the necessary menu operations without being conscious of specific switching operations. Further, when the display of the menu screen is not requested, it is possible to see the same information on both the video camera 100 and the operation device 101. An advantage in the design is that it is possible to reduce the design man-hours as it is not necessary to implement a menu screen unique to the operation device 101.

If a menu screen is opened from the video camera 100 when menu screens in both the video camera 100 and the operation device 101 are not open, the menu screen of the operation device 101 can also be opened in conjunction with the opening. Therefore, the assistant using the operation device 101 can ascertain all the setting changes made by the cameraman.

In the setting of the video camera 100, it is possible to set so as not to accept menu operation on the video camera 100 when the menu screen is displayed on the operation device 101. Therefore, it is possible to avoid a case where erroneous operation occurs due to the cameraman performing menu operation from the video camera 100 when the assistant is operating the menu on the operation device 101. At this time, it is possible to perform, on the video camera 100, a display by which it can be seen that the operation is not accepted because the menu screen is opened on the operation device 101, and the operation device 101 can display that there has been a menu display operation on the video camera 100. Therefore, the cameraman can recognize that the assistant is operating the menu, and the assistant can recognize that the cameraman wants to operate the menu.

In the setting of the video camera 100, it is possible to set to open the menu screen on the video camera 100 when the cameraman operates to open the menu screen on the video camera 100 while the assistant is displaying the menu screen with the operation device 101. Therefore, when the assistant has the menu open on the operation device 101, the cameraman can open the menu screen on the main body to ascertain the menu operation by the assistant. Further, in another setting, it is possible to display the menu screen with increased transparency on the video camera 100 in conjunction with the display of the menu screen on the operation device 101. Therefore, even when the menu screen is unexpectedly displayed on the video camera 100 by an operation of the assistant, the cameraman can continuously confirm an image as well as ascertain the menu operation by the assistant.

In the above configuration, since the user can operate the video camera 100 from the operation device 101 on the same menu screen as the video camera 100, there is no burden of having to become accustomed to the operation system that is unique to the operation device 101. In view of the design man-hours, since the menu screen of the video camera 100 and the operation device 101 can be made common, only one menu screen needs to be implemented, and the man-hours for implementing a unique menu screen for the operation device 101 can be eliminated.

While the present invention has been described in detail based on the preferred embodiments thereof, the present invention is not limited to these specific embodiments, and various forms within the scope not departing from the spirit of the present invention are also included in the present invention. The parts of the embodiments described above may be appropriately combined.

Also included in the present invention is the case where a software program for realizing the functions of the above-described embodiments is supplied to a system or apparatus having a computer capable of executing the program directly from a storage medium or by using wired/wireless communication and the program is executed.

Therefore, program code itself supplied and installed in a computer in order for the computer to realize the functional processing of the present invention also realizes the present invention. That is, the computer program itself for implementing the functional processing of the present invention is also included in the present invention.

In such a case, the program may be of any form, such as object code, a program executed by an interpreter, or script data supplied to the OS, so long as it has the function of a program.

A storage medium for supplying a program may be, for example, a hard disk, a magnetic storage medium such as a magnetic tape, an optical/magneto-optical storage medium, or a nonvolatile semiconductor memory.

As a method of supplying a program, a method of storing a computer program that forms the present invention in a server on a computer network and a connected client computer downloading and programming the computer program can be considered.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-084086, filed May 18, 2021, which is hereby incorporated by reference herein in its entirety.

What is claimed is:

1. An image capturing apparatus capable of being operated by an operation device that is external, the apparatus comprising:
an image capturing device configured to capture and output a first image;
a first display device; and
at least one processor or circuit configured to function as
a control unit configured to control, when the first image that is outputted from the image capturing device is being displayed on the first display device, in a case where there has been an operation on the operation device to display a second image that is different from the first image on a second display device of the operation device, whether or not to display the second image on the first display device,
wherein the second image is a menu screen for performing an operation on the operation device
wherein the control unit is configured to, in a case where the menu screen is being displayed on the operation device, in a case where an instruction for displaying the menu screen has been made on the image capturing apparatus, continue to display the first image on the first display device,
wherein the control unit is configured to, in a case where the menu screen is being displayed on the operation device, in a case where an instruction for displaying the menu screen has been made on the image capturing apparatus, display on the first display device that an instruction for displaying the menu screen from the image capturing apparatus is not accepted.

2. The image capturing apparatus according to claim 1, wherein the at least one processor or circuit is configured to further function as a drawing unit configured to draw an on-screen image that includes information on the image capturing apparatus and/or a menu for performing at least one setting of the image capturing apparatus.

3. The image capturing apparatus according to claim 2, wherein the at least one processor or circuit is configured to further function as a compositing unit configured to composite the first image and the on-screen image.

4. The image capturing apparatus according to claim 1, wherein the control unit is configured to, in a case of displaying the menu screen on the first display device, output the menu screen to the operation device so as to also display the menu screen on the second display device of the operation device.

5. The image capturing apparatus according to claim 1, wherein the control unit is configured to, in a case where the menu screen is being displayed on the operation device, in a case where an instruction for displaying the menu screen has been made on the image capturing apparatus, output a first display, which indicates that an instruction for displaying the menu screen has been made on the image capturing apparatus, to the operation device such that the second display device of the operation device displays the first display.

6. The image capturing apparatus according to claim 1, wherein the control unit is configured to, in a case where the menu screen is being displayed on the operation device, in a case where an instruction for displaying the menu screen has been made on the image capturing apparatus, output the menu screen to the operation device such that the second display device of the operation device displays the menu screen that is displayed on the first display device.

7. The image capturing apparatus according to claim 1, wherein the control unit is configured to, when the first image that is outputted from the image capturing device is being displayed on the first display device, in a case where there has been an operation on the operation device to display the second image that is different from the first image on the second display device of the operation device, display the second image with increased transparency comparing with a predetermined transparency on the first display device.

8. The image capturing apparatus according to claim 1, wherein the control unit is configured to cause the first display device to at least display a display indicating whether or not the image capturing apparatus is in a state in which image capturing is being performed.

9. The image capturing apparatus according to claim 1, wherein the control unit is configured to cause the first display device to at least display a display indicating time information of the image capturing by the image capturing apparatus.

10. A method of controlling an image capturing apparatus capable of being operated by an operation device that is external, the apparatus comprising an image capturing means for capturing and outputting a first image, the method comprising:
when the first image that is outputted from the image capturing device is being displayed on a first display device of the image capturing device, in a case where there has been an operation on the operation device to display a second image that is different from the first image on a second display device of the operation device, controlling whether or not to display the second image on the first display device,
wherein the second image is a menu screen for performing an operation on the operation device
wherein in the controlling, in a case where the menu screen is being displayed on the operation device, in a case where an instruction for displaying the menu screen has been made on the image capturing apparatus, displaying the first image on the first display device is continued, and
wherein in the controlling, in a case where the menu screen is being displayed on the operation device, in a case where an instruction for displaying the menu screen has been made on the image capturing apparatus, it is displayed on the first display device that an instruction for displaying the menu screen from the image capturing apparatus is not accepted.

11. A non-transitory computer-readable storage medium that stores a program for causing a computer to function as an image capturing apparatus capable of being operated by an operation device that is external, the apparatus comprising:
an image capturing device configured to capture and output a first image;
a first display device; and
at least one processor or circuit configured to function as
a control unit configured to control, when the first image that is outputted from the image capturing device is being displayed on the first display device, in a case where there has been an operation on the operation device to display a second image that is different from the first image on a second display device of the operation device, whether or not to display the second image on the first display device,
wherein the second image is a menu screen for performing an operation on the operation device
wherein the control unit is configured to, in a case where the menu screen is being displayed on the operation device, in a case where an instruction for displaying the menu screen has been made on the image capturing apparatus, continue to display the first image on the first display device, and wherein the control unit is configured to, in a case where the menu screen is being displayed on the operation device, in a case where an instruction for displaying the menu screen has been made on the image capturing apparatus, display on the first display device that an instruction for displaying the menu screen from the image capturing apparatus is not accepted.

* * * * *